US 11,543,225 B2

(12) United States Patent
Fuchigami et al.

(10) Patent No.: US 11,543,225 B2
(45) Date of Patent: Jan. 3, 2023

(54) CALIPER MEASUREMENT FORCE DETECTING DEVICE

(71) Applicant: MITUTOYO CORPORATION, Kanagawa (JP)

(72) Inventors: Kohei Fuchigami, Kanagawa (JP); Osamu Saito, Kanagawa (JP); Keisuke Iori, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 3 days.

(21) Appl. No.: 17/324,515

(22) Filed: May 19, 2021

(65) Prior Publication Data

US 2021/0372760 A1 Dec. 2, 2021

(30) Foreign Application Priority Data

May 26, 2020 (JP) .............................. JP2020-091158

(51) Int. Cl.
*G01B 3/00* (2006.01)
*G01B 3/18* (2006.01)
*G01B 3/20* (2006.01)

(52) U.S. Cl.
CPC ............... *G01B 3/008* (2013.01); *G01B 3/18* (2013.01); *G01B 3/205* (2013.01)

(58) Field of Classification Search
CPC .......... G01B 3/008; G01B 3/18; G01B 3/205; G01B 3/20; G01L 5/00
See application file for complete search history.

(56) References Cited

U.S. PATENT DOCUMENTS

| | | | |
|---|---|---|---|
| 2,593,029 A | | 4/1952 | Holdredge |
| 5,003,829 A | * | 4/1991 | DeConti ............... F16D 65/128 73/862.12 |
| 5,095,155 A | | 3/1992 | Mitchell |
| 6,381,369 B1 | | 4/2002 | Kondo |
| 8,276,997 B2 | * | 10/2012 | Tahara .................. B60T 8/3225 303/3 |
| 8,898,923 B2 | * | 12/2014 | Nahum ................. G01L 1/2206 33/810 |
| 9,612,099 B2 | * | 4/2017 | Emtman ................ G01B 3/205 |
| 2014/0150570 A1 | * | 6/2014 | Nahum ................. G01L 1/2206 73/862.541 |
| 2015/0236755 A1 | | 8/2015 | Kuji et al. |

(Continued)

FOREIGN PATENT DOCUMENTS

JP S55-11442 U 1/1980

*Primary Examiner* — Yaritza Guadalupe-McCall
(74) *Attorney, Agent, or Firm* — Greenblum & Bernstein, P.L.C.

(57) ABSTRACT

A caliper measurement force detecting device includes a fixed unit that is securely attached to a slider so as not to displace relative to the slider; a movable unit that is provided to allow a slight displacement relative to the fixed unit along a direction parallel to a displacement direction of the slider; and pressure detectors that are arranged between the fixed unit and the movable unit and are provided so as to detect pressure applied in the direction parallel to the displacement direction of the slider. The movable unit includes an alternative finger hook that is arranged near a finger hook of the slider and serves as an operator that pushes and pulls the slider instead of the finger hook of the slider.

7 Claims, 13 Drawing Sheets

(56) References Cited

U.S. PATENT DOCUMENTS

| | | | |
|---|---|---|---|
| 2015/0247742 A1* | 9/2015 | Cook | G01D 5/12 |
| | | | 33/784 |
| 2015/0276366 A1* | 10/2015 | Emtman | G01B 3/205 |
| | | | 33/701 |
| 2015/0316365 A1* | 11/2015 | Emtman | G01B 3/008 |
| | | | 33/701 |
| 2021/0261107 A1* | 8/2021 | Atsushi | B60T 7/22 |
| 2021/0372760 A1* | 12/2021 | Fuchigami | G01B 3/205 |

* cited by examiner

CALIPER MEASUREMENT FORCE DETECTING DEVICE

CROSS-REFERENCE TO RELATED APPLICATIONS

The present application claims priority under 35 U.S.C. § 119 of Japanese Application No. 2020-091158, filed on May 26, 2020, the disclosure of which is expressly incorporated by reference herein in its entirety.

BACKGROUND OF THE INVENTION

1. Field of the Invention

The present invention relates to a caliper measurement force detecting device that is detachably attached to a slider of a caliper and that detects measurement force of the caliper.

2. Description of Related Art

A caliper is a compact measuring device (small tool) that measures dimensions of a work piece (measured object). When measuring dimensions of the work piece (measured object) with the caliper, a user puts a finger on an operator of a slider and moves the slider by pushing or pulling the operator to bring a measurement jaw into contact with a measurement site of the work piece (measured object). Therefore, a pushing force (measurement force) on the work piece (measured object) changes based on who is measuring, which may cause variations in measured values.

In view of the above, a caliper (measuring device) that includes a mechanism to stabilize measurement pressure has been suggested. In Japanese Examined Utility Model Publication No. S55-11442, for example, a caliper has been suggested in which a pressure detection mechanism and a pressure indicator (measurement pressure display) are incorporated into an exterior measurement jaw of a main scale. Also, in U.S. Pat. Nos. 2,593,029; 5,095,155; and 6,381,369, a caliper has been suggested in which a constant pressure mechanism is incorporated into a finger hook of a slider. For example, the constant pressure mechanism is a spring mechanism that spins when force applied to the slider from the finger exceeds a predetermined value.

As described in Japanese Examined Utility Model Publication No. S55-11442, when the pressure detection mechanism and the pressure indicator (measurement pressure display) are incorporated into the exterior measurement jaw of the main scale, a size, weight, and price of the caliper all increase. In addition, since the measured value of the caliper is displayed on the slider side (or scale mark is read), measurement work while reading the pressure indicator of the exterior measurement jaw is accompanied with a significant movement of sight line, and therefore, measurement efficiency may not be improved.

When the constant pressure mechanism is incorporated into the finger hook of the slider (U.S. Pat. Nos. 2,593,029; 5,095,155; and 6,381,369), variations may arise in the measurement force actually applied to the work piece (measured object) because sliding resistance that belongs to the caliper itself varies. In addition, it is difficult for a person measuring to tell when the jaw is in contact with the work piece, and to feel how much force is actually applied to the work piece.

SUMMARY OF THE INVENTION

The present invention has been conceived in order to resolve the conventional circumstances and provides a caliper measurement force detecting device that is detachably attached to a slider of a caliper and detects measurement force of the caliper.

The caliper measurement force detecting device of the present invention is detachably attached to the slider of the caliper and detects measurement force of the caliper. The caliper measurement force detecting device includes a fixed unit that is securely attached to the slider so as not to displace relative to the slider; a movable unit that is provided to allow a slight displacement relative to the fixed unit along a direction parallel to a displacement direction of the slider; and pressure detectors that are arranged between the fixed unit and the movable unit and are provided so as to detect pressure applied in the direction parallel to the displacement direction of the slider, and the movable unit includes an alternative finger hook that is arranged near the finger hook of the slider and serves as an operator that pushes and pulls the slider in place of the finger hook of the slider.

According to an aspect of the present invention, between the movable unit and the fixed unit, first and second elastic bodies are preferably provided that apply equal force to the movable unit from both directions, in the direction parallel to the displacement direction of the slider, such that a relative position of the movable unit with respect to the fixed unit is a predetermined neutral position.

According to another aspect of the present invention, preferably, guide grooves or projections are provided to one of the fixed unit and the movable unit and extend in the direction parallel to the displacement direction of the slider, and projecting portions or groove portions are provided to the other of the fixed unit and the movable unit and are fitted to the guide grooves or the projections and slide in the direction parallel to the displacement direction of the slider.

According to another aspect of the present invention, preferably, the fixed unit includes a casing securely fixated to a back side of the slider; the casing has an opening on a bottom end surface so as to receive a portion of the movable unit and forms a storage space inside of the casing; the casing further includes one end side walls and other end side walls that face each other with a predetermined interval in the displacement direction of the slider on a plane perpendicular to the displacement direction of the slider; the pressure detectors include a first pressure detecting element arranged so as to be pushed against the one end side walls inside the casing and a second pressure detecting element arranged so as to be pushed against the other end side walls inside the casing; the first elastic body is arranged between the first pressure detecting element and the movable unit; and the second elastic body is arranged between the second pressure detecting element and the movable unit.

According to another aspect of the present invention, preferably, a shaft that is fixated in the direction parallel to the displacement direction of the slider is provided so as to bridge the one end side walls and other end side walls inside the casing, and the movable unit has a through-hole through which the shaft is passed, and allows displacement in the direction parallel to the displacement direction of the slider along the shaft.

According to another aspect of the present invention, when the pressure detecting elements detect a predetermined measurement force, preferably, a user is notified by sound or light from the caliper measurement force detecting device or the caliper.

According to another aspect of the present invention, when the pressure detecting elements detect the predetermined measurement force, the caliper measurement force detecting device preferably latches the measured value to the caliper.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
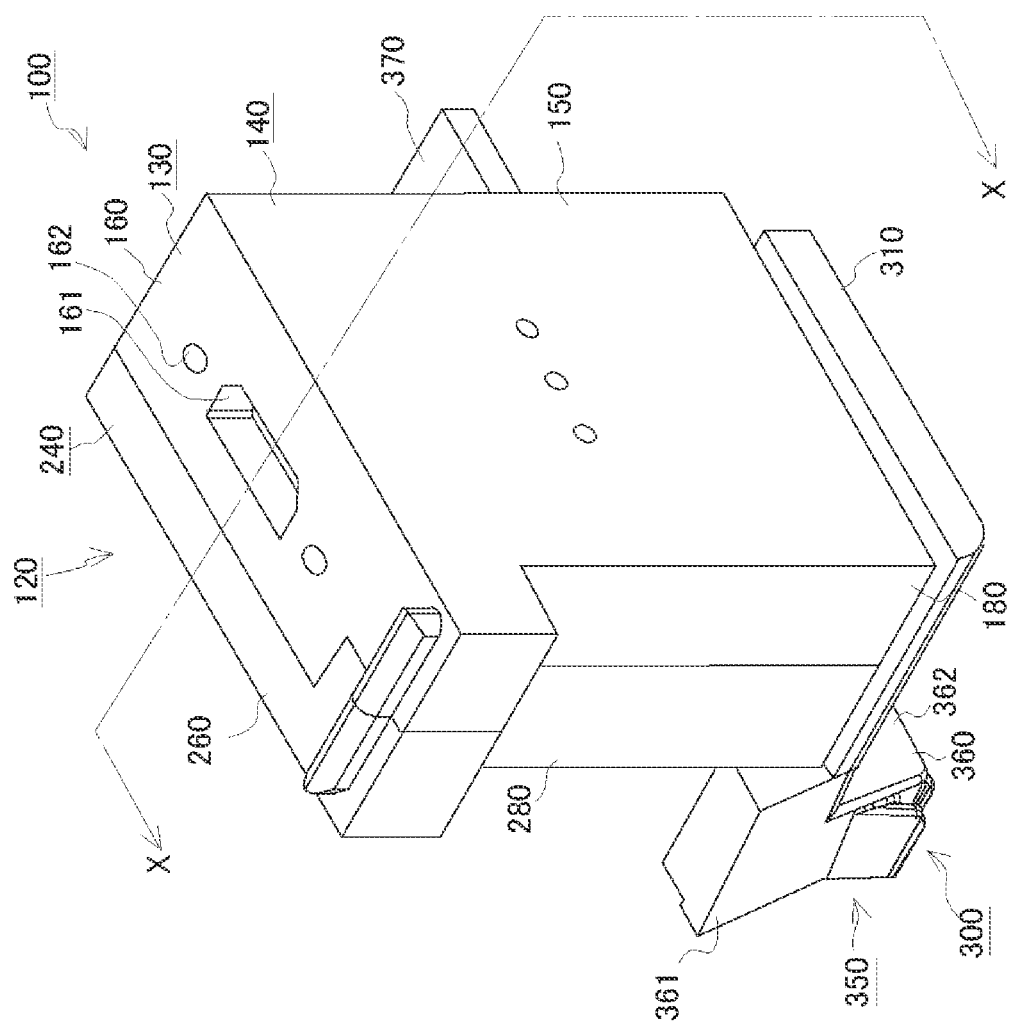
FIG. 1 is a view from a front side of a caliper measurement force detecting device.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

A description of an embodiment of the present invention is given with reference to the drawings and to the reference numerals assigned to each component in the drawings.

First Embodiment

Figure 2:
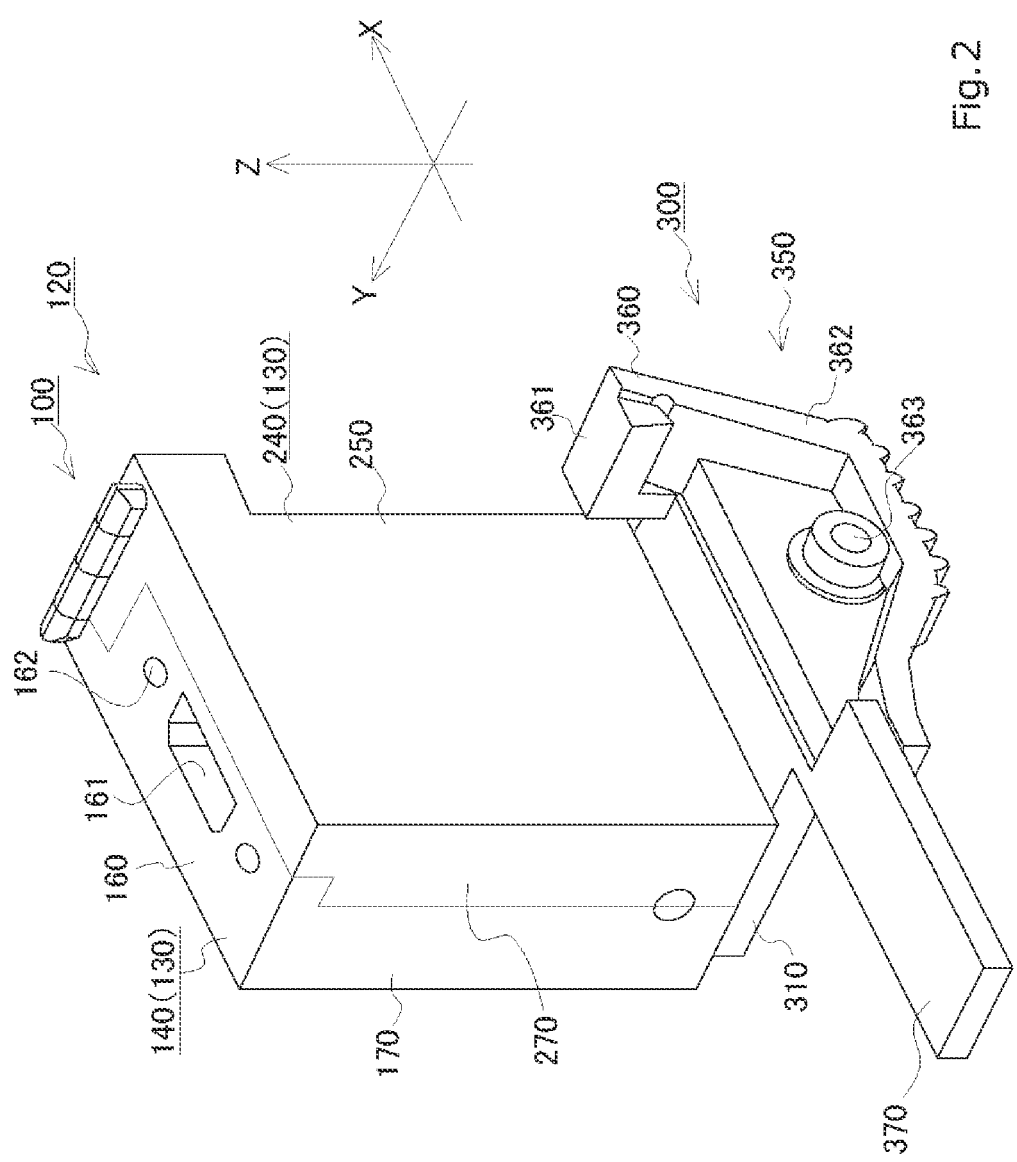
FIG. 2 is a view from a back side of the caliper measurement force detecting device.

FIG. 1 is a view from a front side of a caliper measurement force detecting device. FIG. 2 is a view from a back side of the caliper measurement force detecting device. A caliper measurement force detecting device 100 according to the present embodiment attaches to/detaches from a caliper 500 as necessary and allows the caliper 500 having no built-in measurement pressure sensor and the like to be used similarly to a caliper with a constant pressure mechanism. In the following description, the caliper measurement force detecting device 100 is called "a measurement force detecting device 100."

Figure 3:
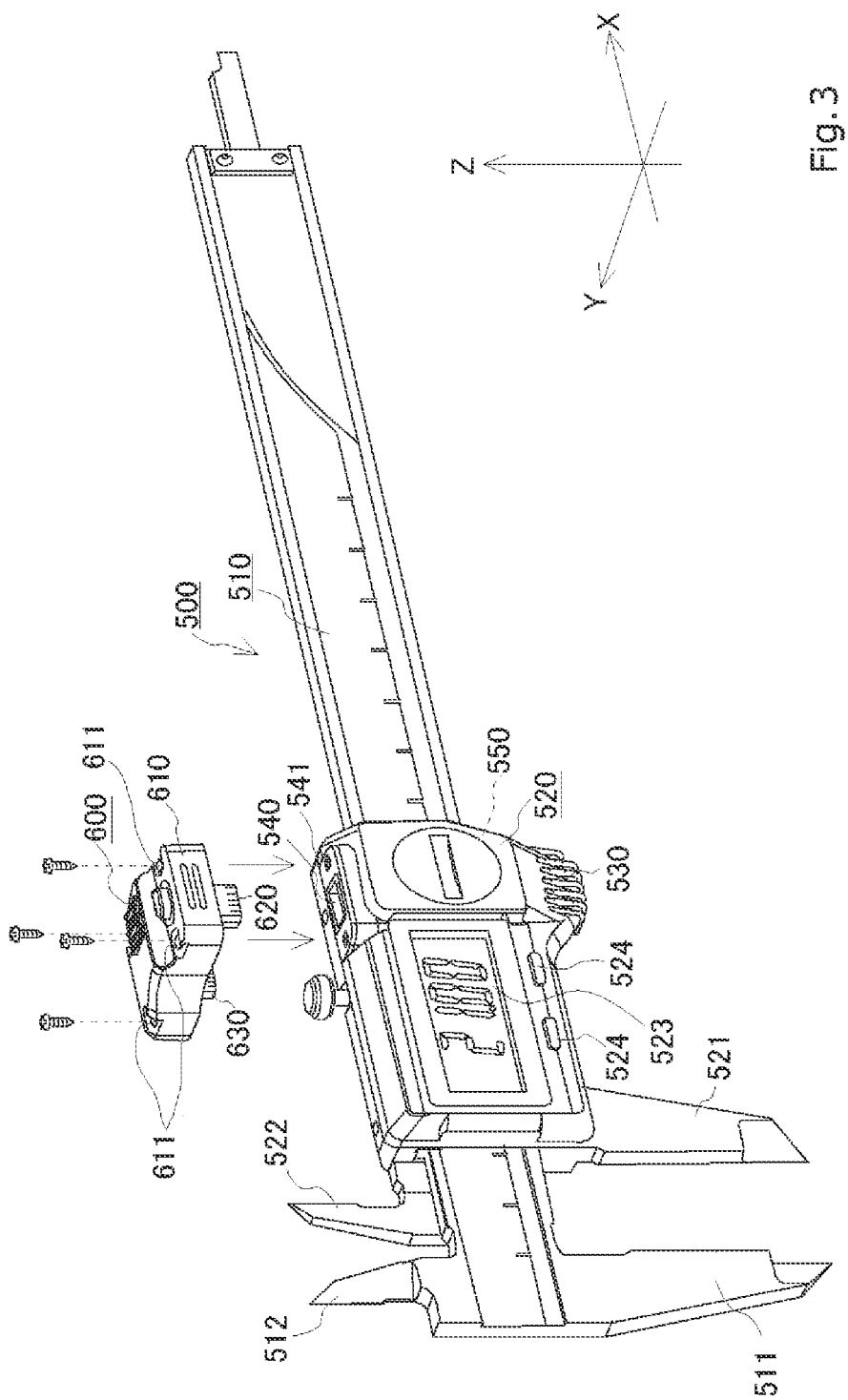
FIG. 3 shows an example where a connection unit attaches to a caliper.
Figure 4:
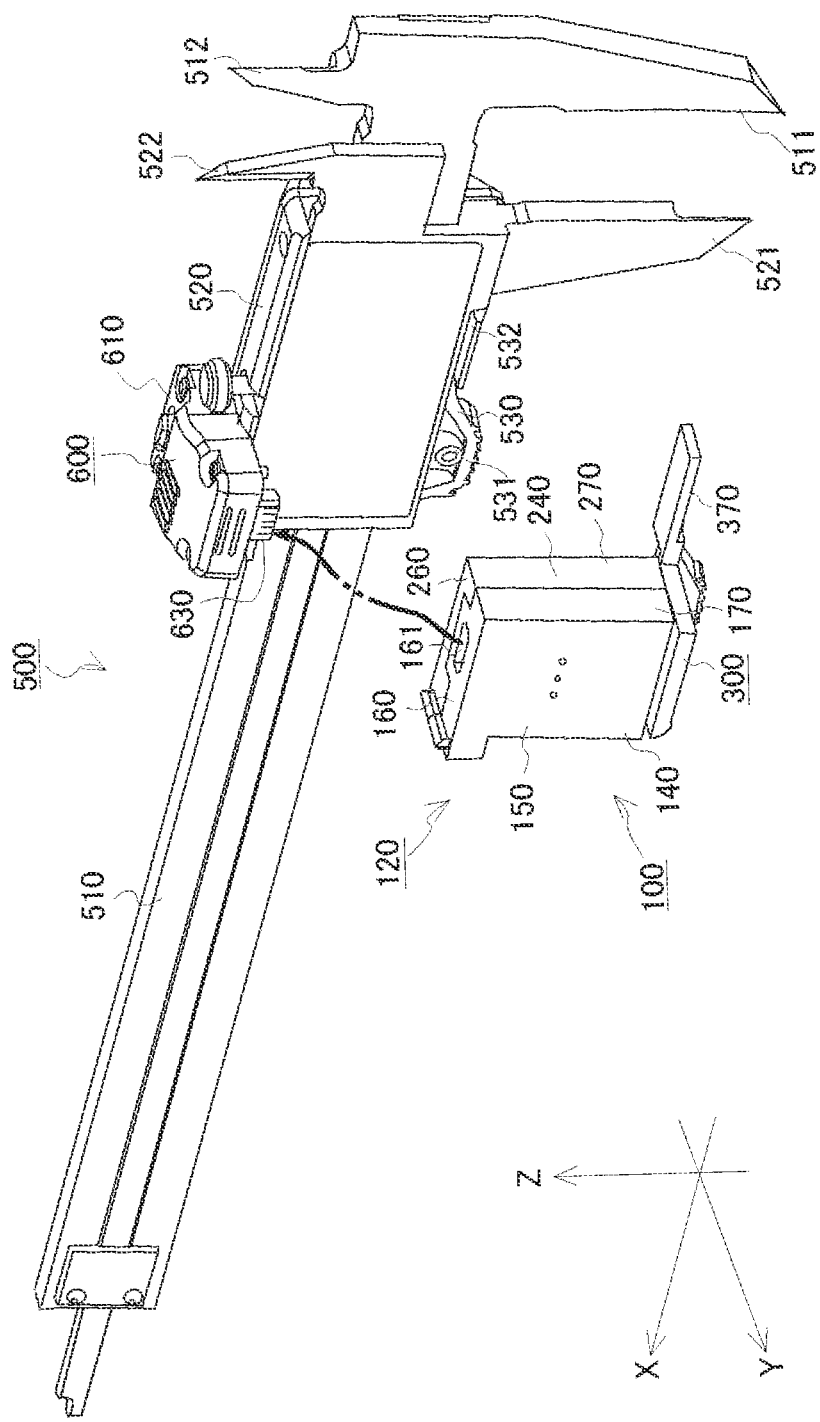
FIG. 4 shows an example where the caliper measurement force detecting device attaches to the caliper.
Figure 5:
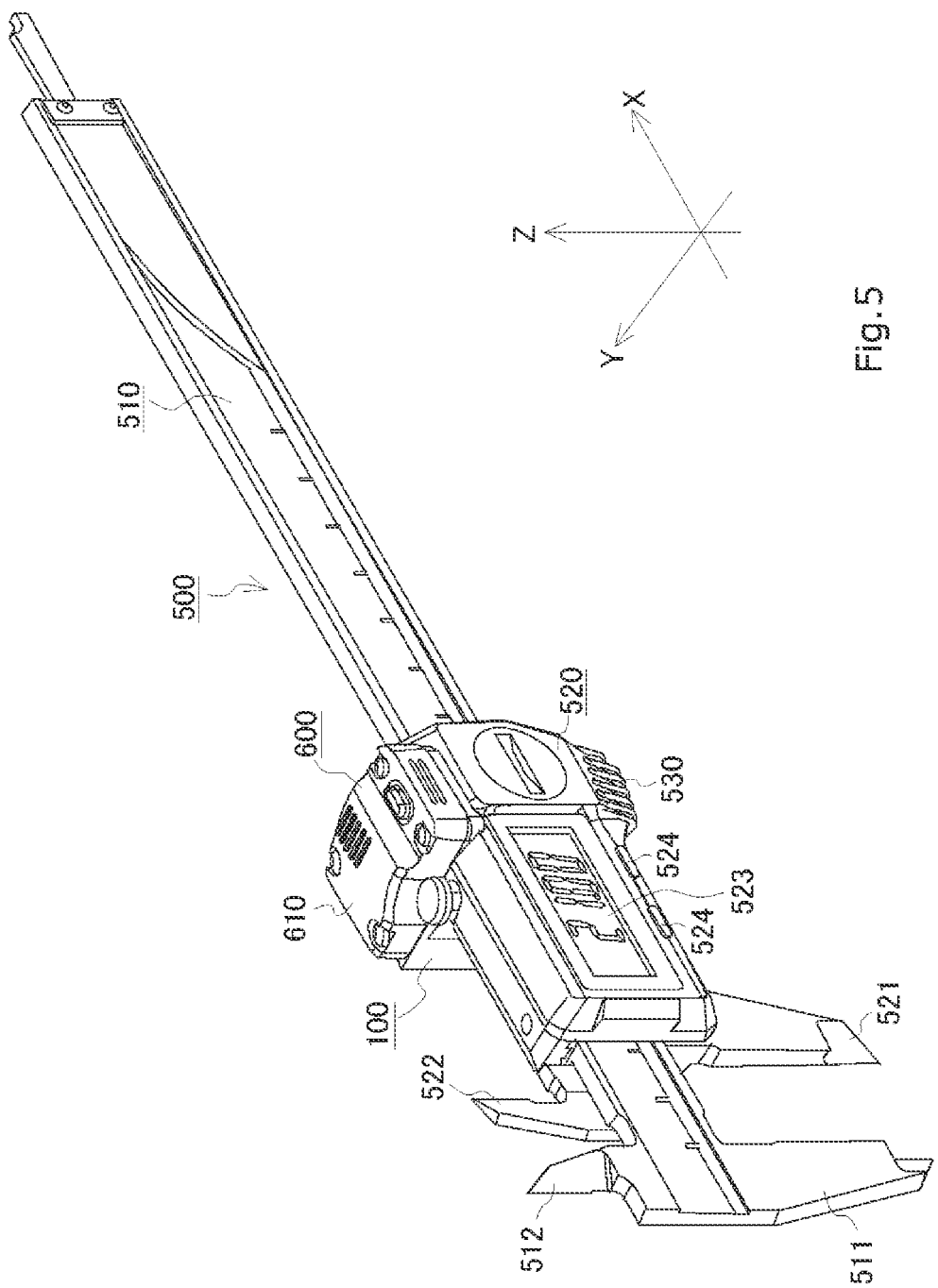
FIG. 5 is a view from a front side of the caliper where the caliper measurement force detecting device is attached to the caliper.
Figure 6:
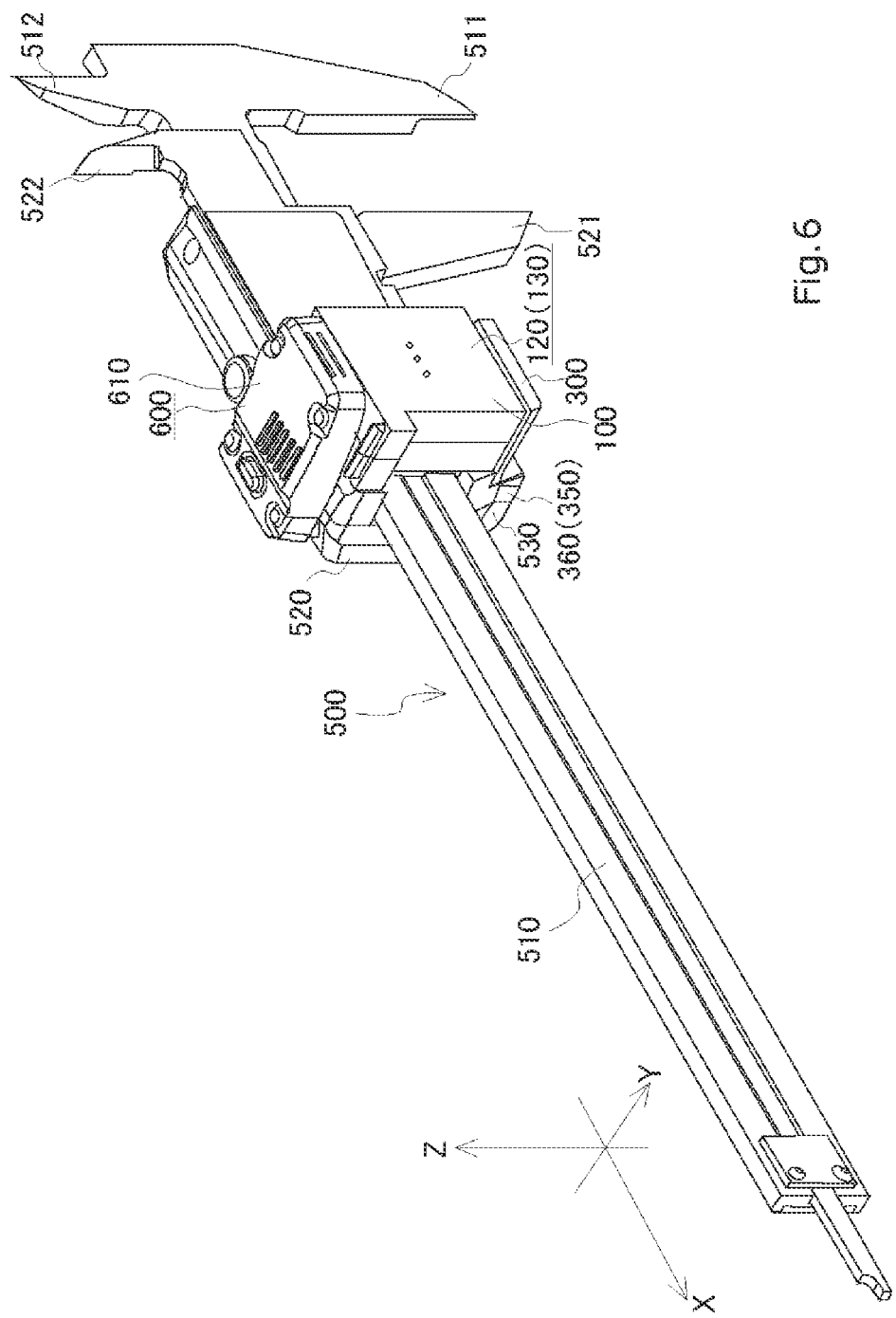
FIG. 6 is a view from a back side of the caliper (front side of the caliper measurement force detecting device) where the caliper measurement force detecting device is attached to the caliper.

Reference is also made to FIGS. 3 to 6. FIG. 3 shows an example where a connection unit 600 attaches to the caliper 500. FIG. 4 shows an example where the measurement force detecting device 100 attaches to the caliper 500. FIG. 5 is a view from a front side of the caliper 500 where the measurement force detecting device 100 is attached to the caliper 500. FIG. 6 is a view from a back side of the caliper 500 (front side of the measurement force detecting device 100) where the measurement force detecting device 100 is attached to the caliper 500.

FIG. 3 shows the caliper 500 and the connection unit 600. The caliper 500 includes a main scale 510 and a slider 520. The main scale 510 is a narrow, rectangular plate member. On a front side of the main scale 510, scale marks are provided along a length direction. On a first end side of the main scale 510, an exterior measurement jaw 511 is provided on a lower edge side, and an interior measurement jaw 512 is provided on an upper edge side. In the present embodiment, a digital caliper 500 is assumed, and therefore, an encoder scale is provided to the main scale 510 along the length direction. Known examples of a detecting method include an electromagnetic induction encoder, a photoelectric encoder, a capacitive encoder, a magnetic encoder, and the like as an encoder.

The slider 520 is provided so as to be capable of sliding displacement along the length direction of the main scale 510. On a first end side of the slider 520, an exterior measurement jaw 521 is provided on a lower edge side, and an interior measurement jaw 522 is provided on an upper edge side. On a front side of the slider 520, a display panel 523 displaying a measured value and the like, and an operation switch 524 are arranged. In addition, on a second end side of the slider 520, a finger hook 530 is provided on a lower edge side, which serves as an operator 350 to push and pull the slider 520. In this example, the finger hook 530 is shaped bulging downward in a protrusion on the lower edge of the slider 520 and is provided with slight unevenness on the surface to prevent slipping.

On a top end surface of the slider 520, a connection port 540 is provided to insert a connector terminal of the connection unit 600. In addition, threaded holes 541 are provided to both sides of the connection port 540. An electric circuit portion 550 is built into the slider 520. For example, a detection head portion detecting a scale signal from the scale, a display controller controlling a display on the display panel 523, a communication controller controlling communication with an external apparatus, or the like are installed as the electric circuit portion 550. In addition, a battery is installed inside the slider 520.

Next, the connection unit 600 is described. The connection unit 600 itself is disclosed also in applicant's U.S. Pat. No. 6,650,860, for example. The connection unit 600 includes a connection unit main body portion 610 which is in a flat rectangular shape, and two connector terminals 620 and 630 that are provided to the connection unit main body portion 610. A first connector terminal 620 of the two connector terminals (620 and 630) is the connector terminal (measuring device connector terminal 620) connecting to the connection port 540 of the caliper 500. Also, a second connector terminal 630 of the two connector terminals (620 and 630) is the connector terminal (external device connector terminal 630) connecting to a connection opening 161 of the external device (here, the measurement force detecting device 100). On a bottom side of the connection unit main body portion 610, the measuring device connector terminal 620 and the external device connector terminal 630 are provided on the same surface (bottom surface in this example) of the connection unit main body portion 610 so as to protrude in the same direction. Screw through-holes 611 are provided at four corners in a top view of the connection unit main body portion 610.

As shown in the drawings (FIG. 6, for example), in order to connect the caliper 500 and the measurement force detecting device 100 via the connection unit 600, when the relative positions of the caliper 500 and the measurement force detecting device 100 are aligned to each other, the surface of the caliper 500 (slider 520) where the connection port 540 is located and the surface of the measurement force detecting device 100 where the connection opening 161 is located are approximately coplanar with each other. Therefore, the bottom side of the connection unit main body portion 610 has an almost flat surface so as to precisely match the shared plane. In this example, a size of the connection unit main body portion 610 and a relative distance between the measuring device connector terminal 620 and the external device connector terminal 630 are designed such that a positional relationship between the measurement force detecting device 100 and the caliper 500 (slider 520) achieves ideal relative positions when the measurement force detecting device 100 is attached to the caliper 500 (slider 520). In this example, the measurement force detecting device 100 is assumed to be in close contact with a back surface of the slider 520, however, the measurement force detecting device 100 is not required to be in contact with the slider 520 and there may be a gap between the measurement force detecting device 100 and the slider 520. The point is that the measurement force detecting device 100 may be configured to be securely held on the back side of the slider 520 via the connection unit 600.

First, a procedure of mounting the measurement force detecting device 100 to the caliper 500 is described with reference to FIGS. 3 to 6. As exemplified in FIG. 3, the connection unit 600 is first attached to the slider 520 of the caliper 500. The measuring device connector terminal 620 of the connection unit 600 is connected to the connection port 540 of the slider 520. Further, the connection unit 600 is fixated to the slider 520 by two screws. Next, as exemplified in FIG. 4, the measurement force detecting device 100 is attached to the slider 520 of the caliper 500. In other words, the measurement force detecting device 100 is attached to the connection unit 600. The external device connector terminal 630 of the connection unit 600 is connected to the connection opening 161 of the measurement force detecting device 100. Both sides of the external device connector terminal 630 are fixated by the screws.

In addition, in FIG. 4, a pin 531 is provided to a back side of the finger hook 530 of the slider 520. Normally, this is where a back side component of the finger hook 530 is fitted and the pin 531 is a pin 531 (boss) for fastening the back side component. The pin 531 is fitted into a hole 363 of an alternative finger hook 360 of the measurement force detecting device 100 (which is described in detail below). This completes attachment of the measurement force detecting device 100 to the caliper 500 (slider 520).

For example, a source of power is supplied from the caliper 500 to the measurement force detecting device 100.

A data latch signal based on measurement pressure is sent from the measurement force detecting device 100 to the caliper 500.

Measurement Force Detecting Device 100

Next, a configuration of the measurement force detecting device 100 is described. As shown in FIG. 6, an XYZ coordinate system of three mutually orthogonal axes is used for ease of description. An X axis is a direction which is parallel to the main scale 510 (displacement direction of the slider 520), based on when the measurement force detecting device 100 is attached to the slider 520 of the caliper 500. A Y axis is a direction passing through the caliper 500 from a front surface to a back surface of the caliper 500. In other words, a direction passing through the measurement force detecting device 100 from a back side of the measurement force detecting device 100 to the front side of the measurement force detecting device 100 is designated as the Y axis. A Z axis is a height direction.

Figure 7:
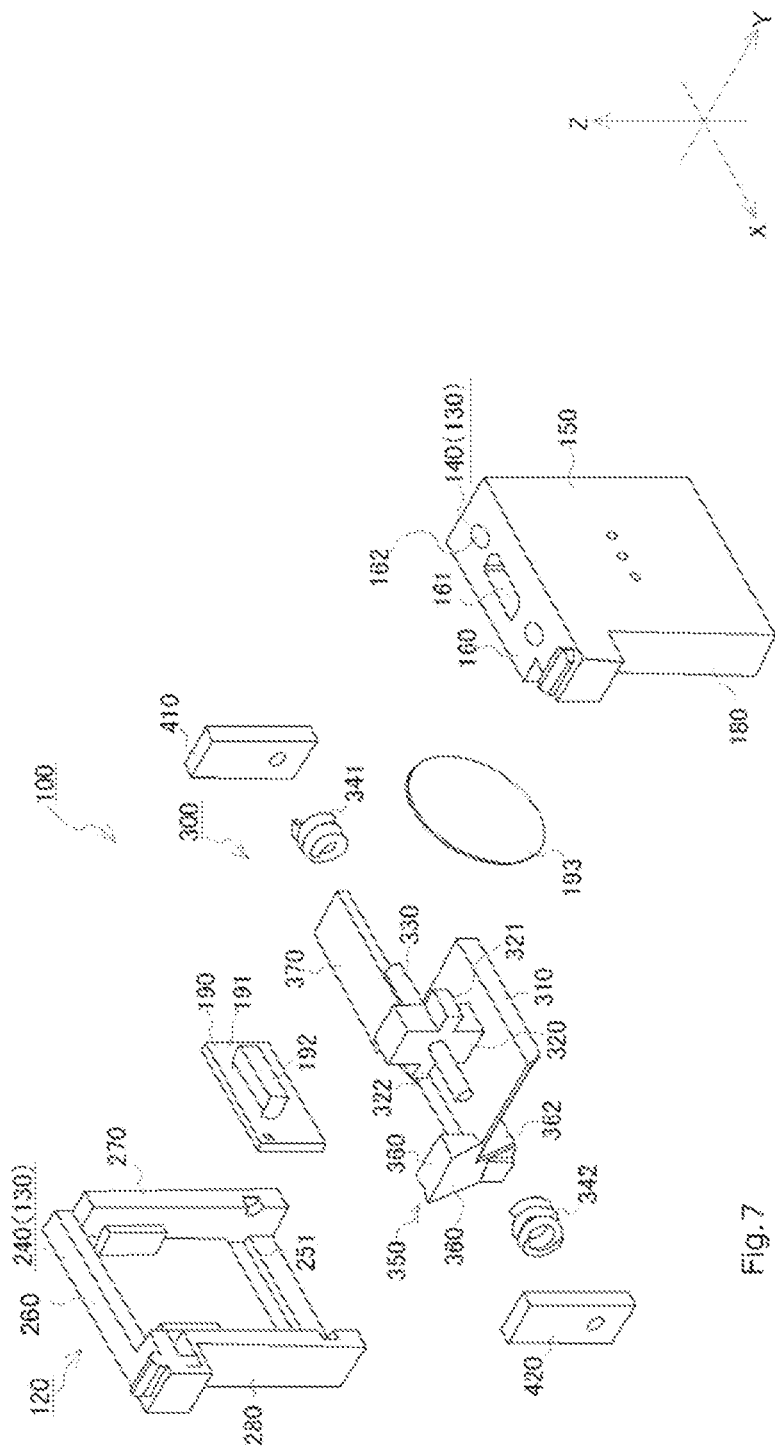
FIG. 7 is an exploded perspective view of the caliper measurement force detecting device.
Figure 8:
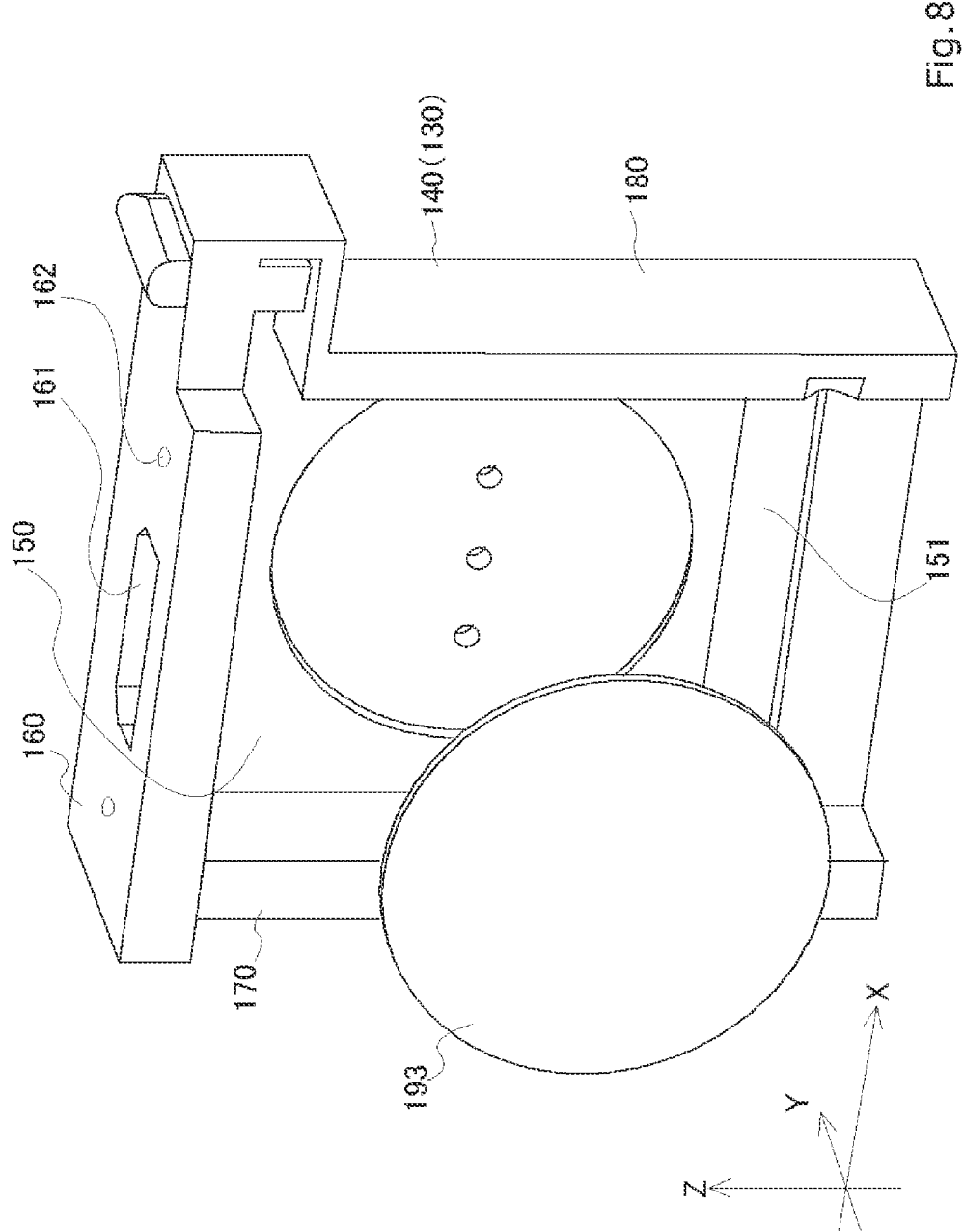
FIG. 8 illustrates an inner side surface of a first cover.
Figure 9:
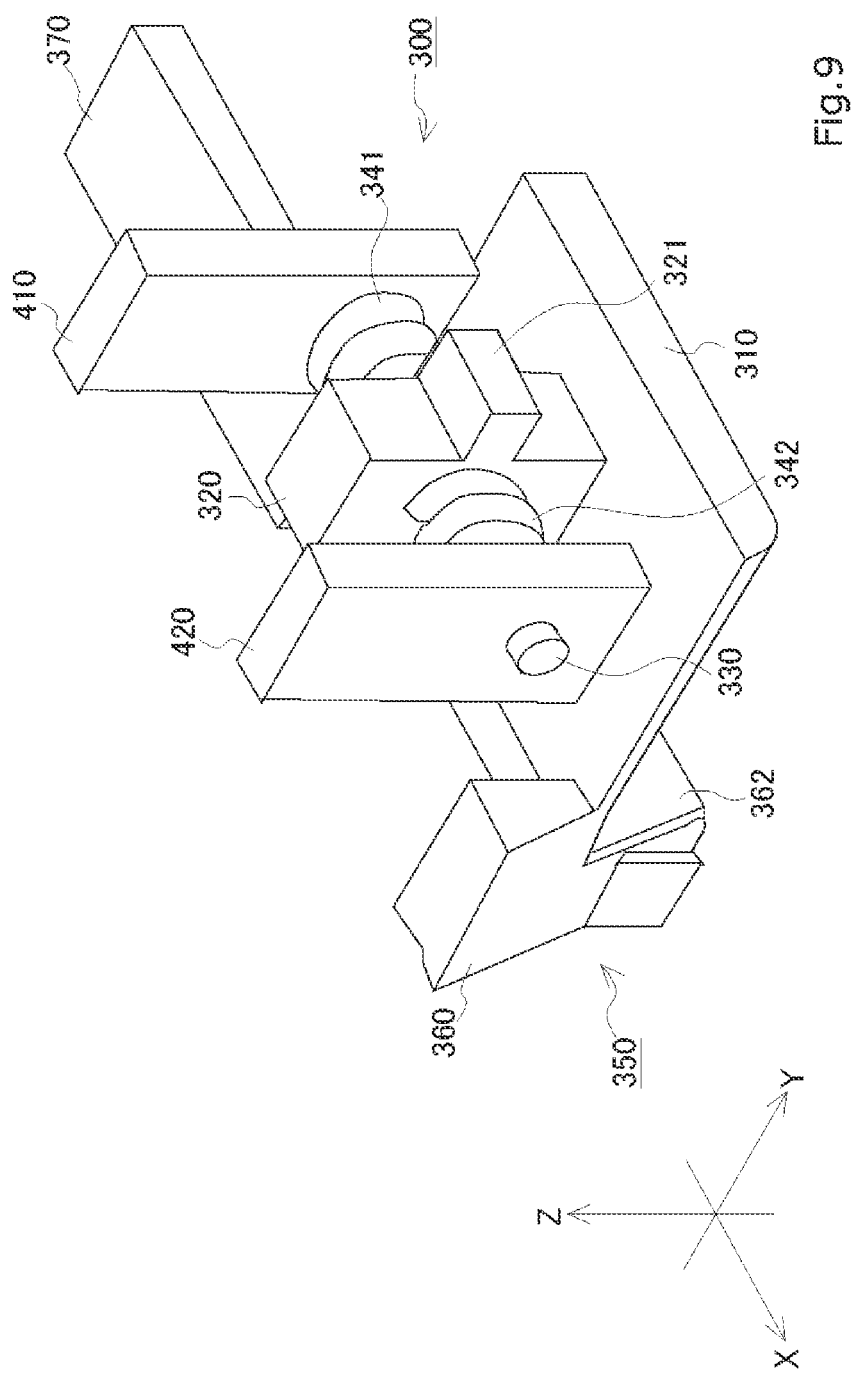
FIG. 9 illustrates an assembly in which pressure detecting elements are attached to a movable unit.

Reference is made to FIGS. 7 to 9 along with the overall perspective views of the measurement force detecting device 100 in FIGS. 1 and 2. FIG. 7 is an exploded perspective view of the measurement force detecting device 100.

The measurement force detecting device 100 includes a fixed unit (also referred to as a "fixed housing") 120, a movable unit (also referred to as a "movable support") 300, and pressure detecting elements (pressure detectors) 410 and 420.

The fixed unit 120 is a rectangular parallelepiped shape having an interior space. The outer shape of the fixed unit 120 is a rectangular parallelepiped and the length (horizontal width) in the X axis direction is shorter than the length (horizontal width) of the slider 520 in the X axis direction. The length (thickness) of the fixed unit 120 in the Y axis direction is comparatively thin and is preferably as thin as possible so that the fixed unit 120 does not affect operability of the caliper 500. The length (height) of the fixed unit 120 in the Z axis direction is roughly the same as the Z axis direction length (height) of the slider 520. In other words, when the measurement force detecting device 100 is attached to the slider 520 of the caliper 500, the top end surface of the slider 520 and the top end surface of the fixed unit 120 are coplanar with each other and also the bottom end surface of the slider 520 and the bottom end surface of the fixed unit 120 are approximately the same height.

When the size of the caliper 500 differs, the size of the slider 520 also differs. In this case, a plurality of measurement force detecting devices 100 in different sizes may be prepared. Alternatively, the measurement force detecting device 100 may be configured so as to enable variable adjustment of the height of the fixed unit 120. In such a case, the fixed unit 120 is further divided into an upper unit and a lower unit, and both the upper unit and the lower unit may slide up and down or be connected by a resin (bellows resin sheet) or an elastic body that is folded so as to expand and contract the space between the upper unit and the lower unit.

As shown in the exploded view of FIG. 7, the fixed unit 120 includes a casing 130 and an electric circuit portion 190, for example. The casing 130 includes a first cover 140 and a second cover 240, and forms a storage space on an inner side when the first cover 140 and the second cover 240 are joined together. However, the bottom end surface of the casing 130 is open.

The first cover 140 mainly configures a front side of the fixed unit 120. FIG. 8 illustrates an inner side surface of the first cover 140. The first cover 140 includes a first base surface 150, a first top end surface 160, a first one end side wall 170, and a first other end side wall 180.

The first base surface 150 is a plane parallel to an XZ plane and is formed in a rectangular plate shape that configures the front side of the fixed unit 120. In the present embodiment, a plurality of small holes are provided in the first base surface 150 so as to facilitate outputting sound from a built-in buzzer (speaker) 193 to an exterior. In addition, a display panel 523 and an operation button may be provided on the first base surface 150 as needed. Further, a first guide groove 151 is provided along the X axis direction (X direction) at a slightly lower position on the inner side surface of the first base surface 150. In a substantially center region of the inner side surface of the first base surface 150, a shallow recess is provided in which to arrange a planar buzzer (speaker) 193.

Wall surfaces stand integrally upright on three sides (top, right, and left) of the first base surface 150 and configure the first top end surface 160, the first one end side wall 170, and the first other end side wall 180, respectively. The first top end surface 160 is a plane parallel to an XY plane. In the first top end surface 160, an opening 161 for a connection port 192 is provided to receive the external device connector terminal 630 of the connection unit 600. Threaded holes 162 are provided to both sides of the opening 161 for the connection port.

The first one end side wall 170 is a plane parallel to a YZ plane and stands upright on one end side surface of the first base surface 150. The first other end side wall 180 is a plane parallel to the YZ plane and stands upright on the other end side surface of the first base surface 150. In other words, the first one end side wall 170 and the first other end side wall 180 face each other with a predetermined interval.

A second cover 240 mainly configures a back side of the fixed unit 120. The second cover 240 includes a second base surface 250, a second top end surface 260, a second one end side wall 270, and a second other end side wall 280. The second base surface 250 is a plane parallel to the XZ plane and is formed in a rectangular plate shape that configures the back side of the fixed unit 120. A second guide groove 251 is provided along the X direction at a slightly lower position on the inner side surface of the second base surface 250. At a slightly higher position on the inner side surface of the second base surface 250, a space is secured to insert the electric circuit portion 190.

Wall surfaces stand integrally upright on three sides (top, right, and left) of the second base surface 250 and configure the second top end surface 260, the second one end side wall 270, and the second other end side wall 280, respectively. The second top end surface 260 is a plane parallel to the XY plane. A portion of the second top end surface 260 is recessed toward the back side (−Y direction) so as to receive the first top end surface 160. A portion of the first top end surface 160 projects toward the back side (−Y direction) so as to fit into the recessed portion. The second one end side wall 270 is a plane parallel to the YZ plane and stands upright on one end side surface of the second base surface 250. The second other end side wall 280 is a plane parallel to the YZ plane and stands upright on the other end side surface of the second base surface 250. In other words, the second one end side wall 270 and the second other end side wall 280 face each other with a predetermined interval.

When the first cover 140 and the second cover 240 are joined such that both end surfaces align to each other, the casing 130 is formed with a storage space inside.

The electric circuit portion 190 includes a circuit board 191 into which an electronic circuit is incorporated and the connection port 192 that is mounted onto the circuit board 191. Examples of the electronic circuit may include an operational amplifier or a differential amplifier that processes (detects/amplifies) a detection signal from the pressure detecting elements 410 and 420 to obtain a sensor signal, as well as a comparator that compares a predetermined threshold value with the sensor signal, or the like. In the comparator, a defined predetermined measurement force is input as a predetermined reference value. The predetermined measurement force may be set and stored by incorporating a memory or a resistor in the electric circuit portion 190 of the measurement force detecting device 100, or may be given from the electric circuit portion 550 of the caliper 500 (slider 520). In addition, if necessary, a driver for the buzzer (speaker) 193 or an interface circuit that controls input/output of the caliper 500-side signal to the electric circuit portion 190 is installed. The electric circuit portion 190 is arranged slightly higher (+Z direction) on the inner side surface of the second cover 240 and the connection port 192 is arranged so as to communicate with the opening 161 for the connection port in the first top end surface 160.

Next, the movable unit 300 is described. FIG. 9 illustrates an assembly in which the pressure detecting elements 410 and 420 are attached to the movable unit 300. The movable unit 300 includes a movable base plate 310, a sliding piece 320, a shaft 330, biasers 341 and 342, and the operator 350.

The movable base plate 310 is formed in a rectangular plate shape and is provided so as to close the opening (also referred to as an "aperture") in a bottom side surface of the casing 130. However, the movable base plate 310 need not completely block the opening of the bottom side surface of the casing 130, and for example, an area of the movable base plate 310 may be smaller than the area of the opening in the bottom side surface of the casing 130. The movable base plate 310 is not fixated to the casing 130 and is capable of displacement relative to the casing 130 (fixed unit 120).

Figure 10:
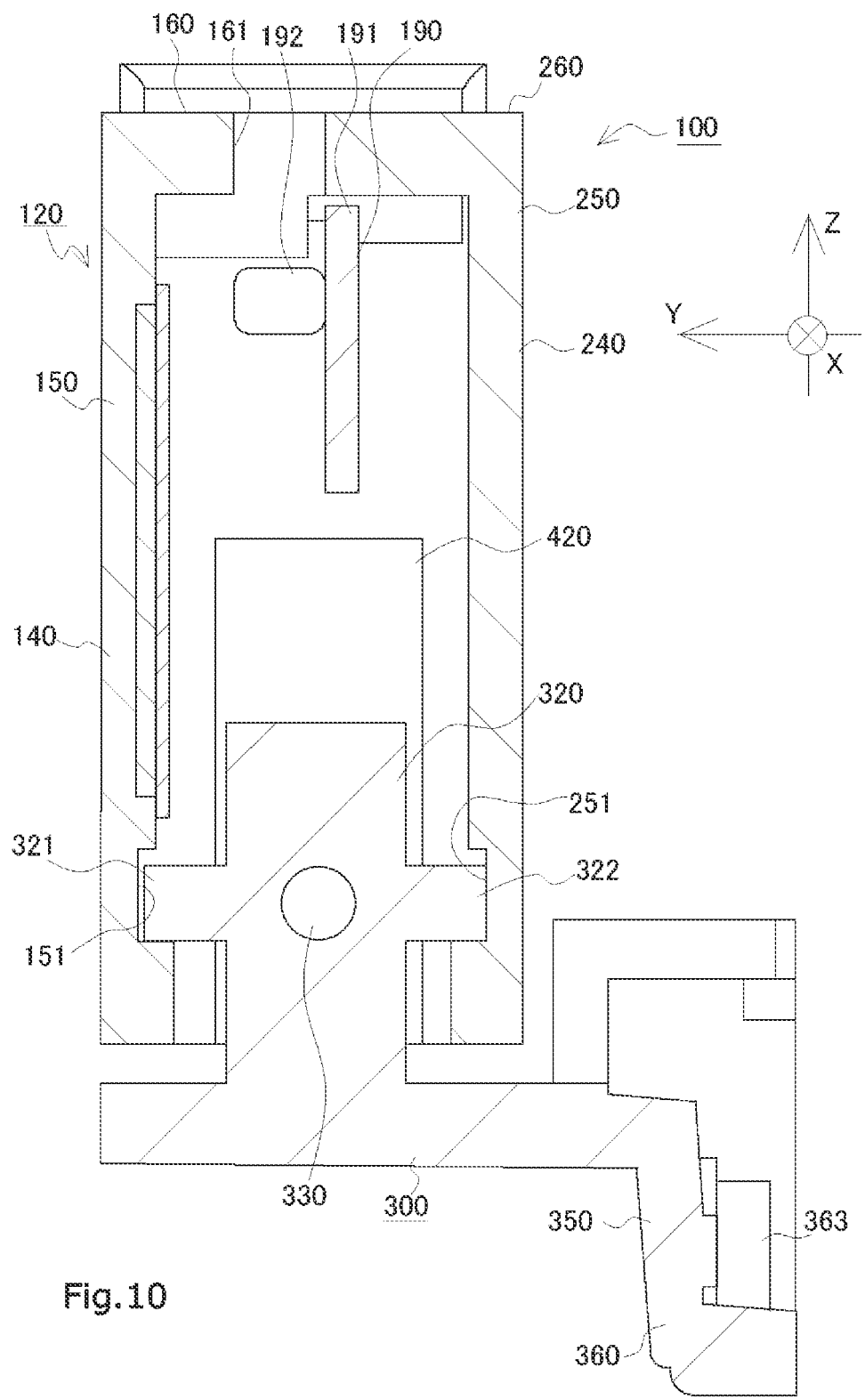
FIG. 10 is a cross-sectional view along a line X-X in FIG. 1.

The sliding piece 320 stands upright at a left-right direction center (X direction center) on the top side surface of the movable base plate 310. The sliding piece 320 is fixated to the movable base plate 310 so as to integrate with the movable base plate 310. The sliding piece 320 includes projecting portions 321 and 322 that are formed projecting so as to be fitted into the guide grooves 151 and 251 of the first cover 140 and the second cover 240. In other words, the front side (+Y direction) surface of the sliding piece 320 includes the first projecting portion 321 projecting toward the front side (+Y direction). In addition, the back side (−Y direction) surface of the sliding piece 320 includes the second projecting portion 322 projecting toward the back side (−Y direction). The first projecting portion 321 is fitted into the first guide groove 151 of the first cover 140 and the second projecting portion 322 is fitted into the second guide groove 251 of the second cover 240. The first projecting portion 321 is fitted into the first guide groove 151 and the second projecting portion 322 is fitted into the second guide groove 251, and in this state, the first cover 140 is joined with the second cover 240. In this example, FIG. 10 is a cross-sectional view along a line X-X in FIG. 1. The sliding piece 320 is configured to be held in a suspended state between the first cover 140 and the second cover 240. Further, the sliding piece 320 is capable of sliding displacement in the X direction, guided by the guide grooves 151 and 251.

The present embodiment shows an example, in which the grooves 151 and 251 are arranged on the first cover 140 and the second cover 240 side, and the projecting portions 321 and 322 are arranged on the sliding piece 320 side. Conversely, grooves may be provided on the sliding piece 320 side and projecting portions may be provided on the first cover 140 and the second cover 240 side.

The shaft 330 is provided so as to pass through the center of the sliding piece 320 in the X direction. The length of the shaft 330 in the X direction is substantially equal to or slightly shorter than the length (horizontal width) of the fixed unit 120 in the X direction. The shaft 330 and the sliding piece 320 are not fixated to each other and the sliding piece 320 is capable of sliding along the shaft 330 (along the X direction).

Semicircular notches are formed on end surfaces of the one and other end side walls 170, 180, 270, and 280 of the first cover 140 and the second cover 240 to sandwich the shaft 330. When the first cover 140 and the second cover 240 are joined, the semicircular notches are joined to each other to create a circular blind hole. (Although a blind hole is formed in this example, the hole may pass through the wall surface.) A first end and a second end of the shaft 330 are respectively fitted into the blind hole and thereby the shaft 330 is securely fixated to the fixed unit 120. With the shaft 330 fixated in this way, the sliding piece 320 is held in a suspended state. In the suspended state, the sliding piece 320 is capable of sliding displacement along the shaft 330 and the guide grooves in the X direction.

A first spring 341 and a second spring 342 are provided as a biaser 340. The first spring 341 is arranged on a surface of a first end side (−X direction side) of the sliding piece 320. The second spring 342 is arranged on a surface of a second end side (+X direction side) of the sliding piece 320. The shaft 330 is configured to pass in between the first spring 341 and the second spring 342. While not essential, the elastic moduli of the first spring 341 and the second spring 342 are preferably equal.

The operator 350 is attached to a back side (−Y direction side) of the movable base plate 310. The operator 350 receives the measurement force applied by a finger to the caliper 500 or the work piece and serves as an initial stage of a force transmitter transmitting the measurement force to the pressure detecting elements 410 and 420 of the measurement force detecting device 100. In addition, the operator 350 also serves as an alternative operator to push and pull the slider 520 in place of the finger hook 530 of the slider 520. The operator 350 includes the alternative finger hook 360 and an auxiliary movable plate 370. The alternative finger hook 360 is positioned on the back side (−Y direction side) of the movable base plate 310 as well as a second end side (+X direction side) of the movable base plate 310, and is fixated so as to be integral with the movable base plate 310. The alternative finger hook 360 has a predetermined surface area to facilitate pushing the second end side (+X direction side) with a finger, and further is shaped to include an indentation (a shallow V in this example) to facilitate pushing with a finger. The alternative finger hook 360 includes a top pushing plate 361 and a bottom pushing plate 362. The top pushing plate 361 is a flat plate provided further upward than the movable base plate 310 and slightly tilted from the Z direction toward the +X direction. The bottom pushing plate 362 is below the movable base plate 310. The surface of the bottom pushing plate 362 has non-slip unevenness.

Further, when viewed from the back side (+Y direction side), the bottom pushing plate 362 is provided with the hole 363 and the hole 363 is designed at a position and in a size to receive the pin 531 that is located on the back side (−Y direction) of the finger hook 530 of the slider 520. However, in order to allow the movable unit 300 to move relative to the slider 520, the size of the hole 363 is required to be slightly bigger than the pin 531 on the back side of the finger hook 530 of the slider 520. In order to allow relative movement between the hole 363 and the pin 531 in a state where the hole 363 and the pin 531 are fitted together to a degree that the components will not slip off each other, an elastic or flexible resin may be provided on an inner circumference of the hole 363.

The slider 520 is not pushed or pulled by the engagement between the hole 363 of the alternative finger hook 360 and the pin 531 of the finger hook 530 of the slider 520. Therefore, the hole 363 of the alternative finger hook 360 is not necessary, or may be a hole with a diameter large enough to receive the pin 531 of the finger hook 530 of the slider 520.

The auxiliary movable plate 370 is on the back side of the movable base plate 310 and is a narrow flat plate extending in the X direction. When the measurement force detecting device 100 is attached to the slider 520 of the caliper 500, the auxiliary movable plate 370 is placed to be in contact with a bottom surface of the slider 520. A projection piece 532 is formed projecting on the bottom side of the slider 520 of the caliper 500 and a fitting groove is formed between the bottom surface of the slider 520 and the projection piece 532. The auxiliary movable plate 370 is fitted into the fitting groove, allowing relative displacement in the X direction while the auxiliary movable plate 370 is in a state supported from below.

The pressure detecting elements 410 and 420 are each a flat plate-shaped element that incorporates a piezoelectric element or a resistance element (piezo resistor) in which pressure is output as voltage change or resistivity change. The two pressure detecting elements 410 and 420 are provided. The first pressure detecting element 410 is arranged so as to be pushed against the one end side walls (170 and 270) on the inner side of the casing 130. In addition, the second pressure detecting element 420 is arranged so as to be pushed against the other end side walls (180 and 280) on the inner side of the casing 130. The first pressure detecting element 410 and the second pressure detecting element 420 are each provided with a through-hole to insert the shaft 330.

When assembling the movable unit 300, the first spring 341 and the second spring 342 are respectively attached to the first end side and the second end side of the shaft 330, and then the first end and the second end of the shaft 330 are inserted into the first pressure detecting element 410 and the second pressure detecting element 420 respectively. The first cover 140 and the second cover 240 are joined such that the sliding piece 320 is inside the first cover 140 and the second cover 240. This creates a state where the first spring 341 is sandwiched between the first pressure detecting element 410 and the sliding piece 320, and the second spring 342 is sandwiched between the second pressure detecting element 420 and the sliding piece 320. At this point, the first pressure detecting element 410 is pushed against the one end side walls (170 and 270) by the first spring 341 and the second pressure detecting element 420 is pushed against the other end side walls (180 and 280) by the second spring 342. In this way, defining the shaft 330 as the center axis, positional relationships of the sliding piece 320, the first spring 341, the second spring 342, the first pressure detecting element 410, the second pressure detecting element 420, the one end side walls (170 and 270), and the other end side walls (180 and 280) are determined and the mutual relative positions are mostly fixed stably except to allow the sliding displacement of the sliding piece 320.

The measurement force detecting device 100 is built (FIGS. 1 and 2) when the first cover 140 and the second cover 240 are joined with the first cover 140 and the second cover 240 holding therebetween the assembly in which the pressure detecting elements 410 and 420 are attached to the movable unit 300 (FIG. 9). The process of attaching the measurement force detecting device 100 to the caliper 500 is described above with reference to FIGS. 3 to 6.

The operation of the measurement force detecting device 100 is described. In this example, a detection signal output from the first pressure detecting element 410 is defined as a first detection signal S1. A detection signal output from the second pressure detecting element 420 is defined as a second detection signal S2. The detection signals S1 and S2 are voltage or current that is generated when the pressure detecting elements 410 and 420 receive a force. A difference between the first detection signal S1 and the second detection signal S2 is a sensor signal Sf.

$$Sf=S1-S2$$

Figure 11:
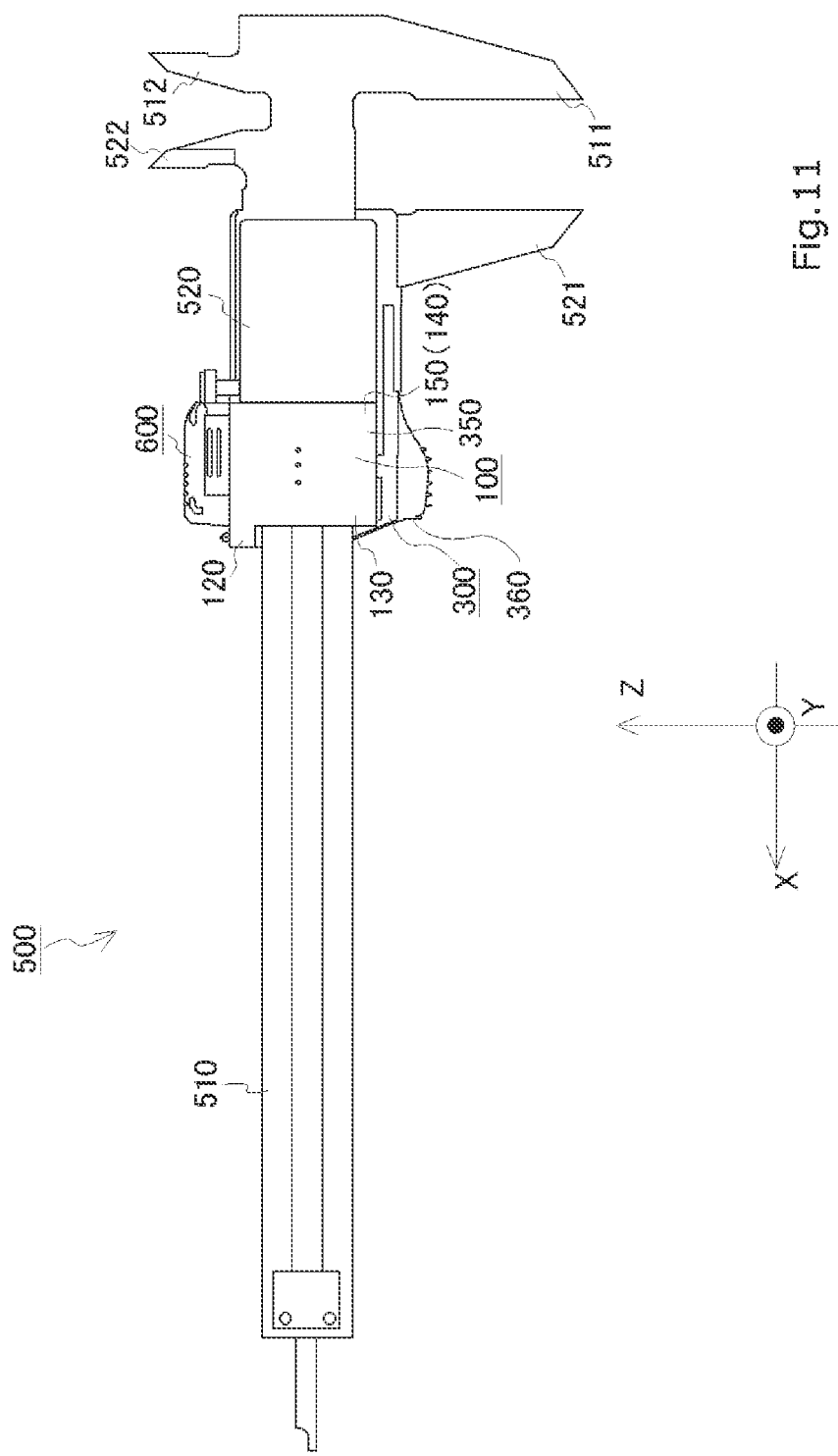
FIG. 11 is an exemplary view of a state where an external force from a finger is applied to neither the caliper measurement force detecting device (alternative finger hook) nor a slider of the caliper.

A state where the external force from the finger is not applied to the measurement force detecting device 100 (alternative finger hook 360) is considered. FIG. 11 illustrates a state where the external force from the finger is applied to neither the measurement force detecting device 100 (alternative finger hook 360) nor the slider 520 of the caliper 500. When the external force from the finger is not applied to the measurement force detecting device 100 (alternative finger hook 360), a force F1 where the first spring 341 pushes the first pressure detecting element 410 and a force F2 where the second spring 342 pushes the second pressure detecting element 420 act in opposite directions with the same magnitude. Therefore, Sf=S1−S2=0.

In addition, the sliding piece 320 is pushed by the forces from the first spring 341 and the second spring 342 having equal magnitude in opposite directions. Accordingly, at a position right in the middle between the one end side walls (170 and 270) and the other end side walls (180 and 280), the forces are balanced and the position of the sliding piece 320 is stable.

Figure 12:
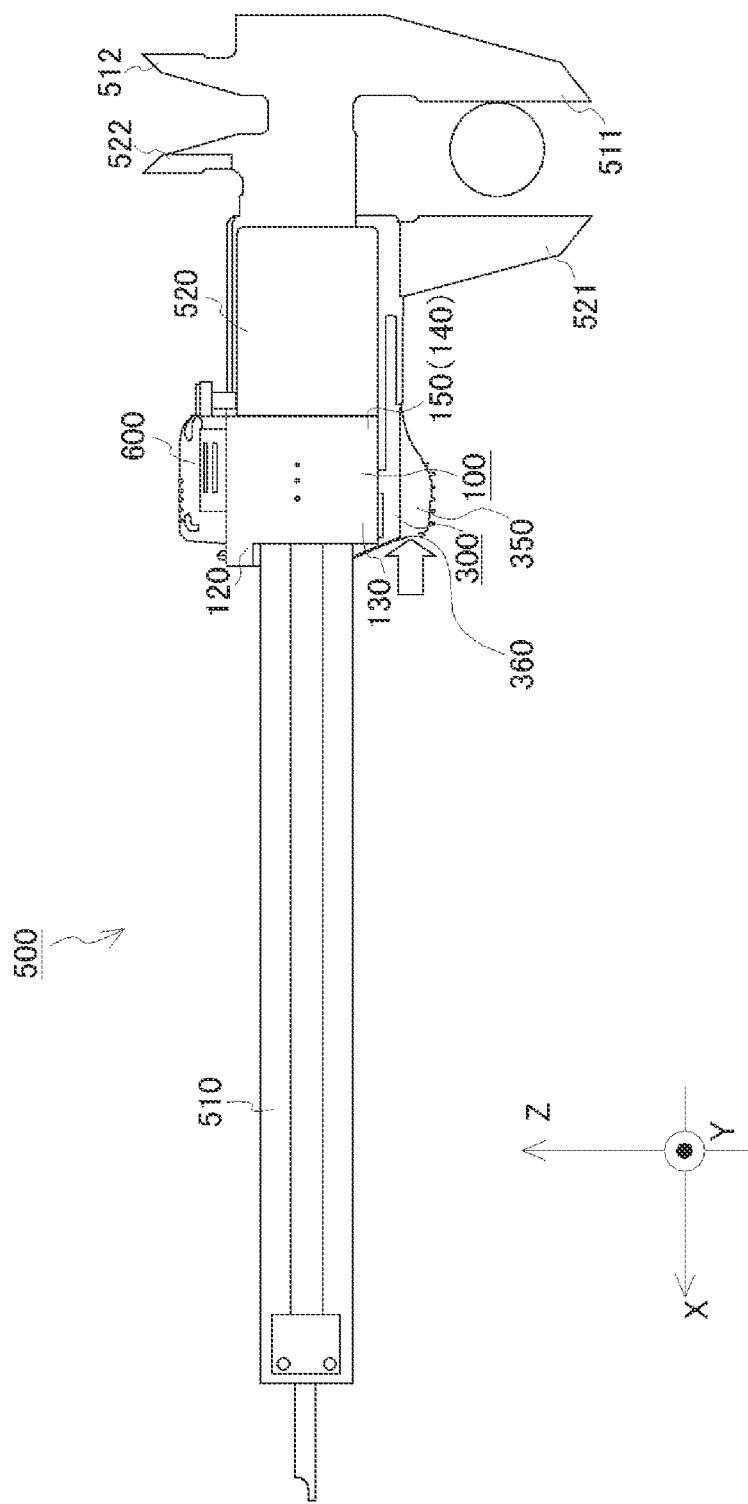
FIG. 12 shows an example where a first end side of the alternative finger hook is slowly pushed.

Next, as exemplified in FIG. 12, the finger is put to the alternative finger hook 360 of the measurement force detecting device 100 and the alternative finger hook 360 is slowly pushed toward the one end side. When the alternative finger hook 360 is pushed toward the one end side, the movable base plate 310 and the sliding piece 320 are integrally pushed to the one end side. Thereupon, the sliding piece 320 pushes the first spring 341 toward the one end side, and further the first spring 341 pushes the first pressure detecting element 410 and the one end side walls (170 and 270) toward the one end side. Here, there is nothing to regulate the displacement of the fixed unit 120 and the slider 520. Therefore, when the force applied to the alternative finger hook 360 exceeds the static resistance (static friction force) of the slider 520, the fixed unit 120 and the slider 520 start sliding displacement toward the one end side together with the alternative finger hook 360 (movable unit 300). At this point, the force applied to the first pressure detecting element 410 is increased and the force applied to the second pressure detecting element 420 is decreased and therefore Sf (=S1−S2)>0. However, when the slider 520 is displaced, the sensor signal Sf shows a value equivalent to the sliding resistance (slip resistance, dynamic friction force) of the slider 520.

Due to product variations and changes over time, the static resistance or sliding resistance varies for every caliper 500, and therefore, the sensor signal value Sf which is equivalent to the static resistance and the sliding resistance may be found by using sampling while moving the slider 520. When defining the predetermined measurement force, the sliding resistance (or static resistance) component should be offset. By doing so, the sliding resistance of the caliper 500 is eliminated and a true measurement force (such as 0.1 N) of the measurement force detecting device 100 (caliper 500) can be set.

The method to set the measurement force is not limited to the above description. For example, a pressure indicator may be actually held between the measurement jaws and the sensor signal SF may be sampled (latched) when the predetermined pressure (measurement pressure) is reached.

Consider an example where the alternative finger hook 360 is pushed and the jaw 521 of the slider 520 and the jaw 511 of the main scale 510 come in contact with the work piece to sandwich the work piece. After the jaws 511 and 521 contact the work piece, a user further pushes the alternative finger hook 360 with a finger. At this point, because the displacement of the slider 520 is stopped by the work piece, the displacement of the fixed unit 120 which is fixed to the slider 520 is also stopped. Therefore, while the fixed unit 120 is stopped, the movable unit 300 along with the alternative finger hook 360 undergoes relative displacement to the one end side. At this point, as the amount of relative displacement of the movable unit 300 increases, the first spring 341 is compressed, and therefore the force with which the first spring 341 pushes the first pressure detecting element 410 increases. On the other hand, the second spring 342 is stretched, so the force with which the second spring 342 pushes the second pressure detecting element 420 decreases. The sensor signal Sf (=S1−S2) gradually increases and the sensor signal Sf exceeds a value equivalent to the sliding resistance of the slider 520 and reaches a value equivalent to the predetermined measurement force.

When the sensor signal Sf reaches the value equivalent to the predetermined measurement force, sound comes out from the buzzer (speaker) 193 and the user understands that the work piece is sandwiched with the predetermined measurement force. When the sensor signal Sf reaches the value equivalent to the predetermined measurement force, the measured value of the caliper 500 may be latched by sending a signal from the measurement force detecting device 100 to the caliper 500. Of course, the force of the first spring 341 pushes the sliding piece 320 back to the other end side, and therefore the user can feel with the finger that the slider 520 is being pushed into the work piece.

Figure 13:
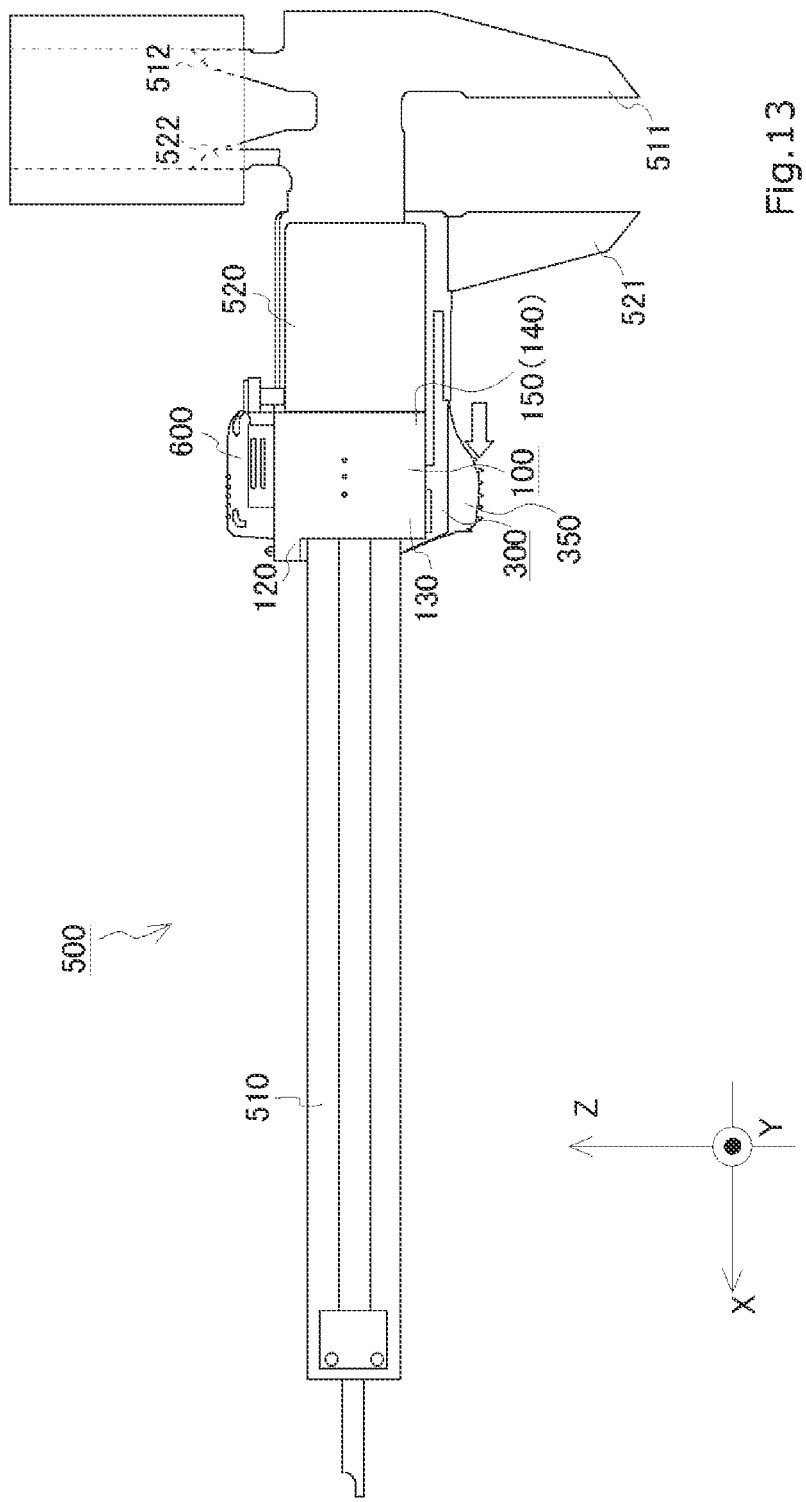
FIG. 13 shows an exemplary operation when an inner diameter (internal dimension) of a work piece is measured.

The description above describes the operation when the outer diameter (external dimension) of the work piece is measured, but as shown in FIG. 13, the operation is almost the same when the inner diameter (internal dimension) of the work piece is measured.

According to the measurement force detecting device 100 of the present embodiment, with the detachable measurement force detecting device 100, work piece dimensions can be measured with variations in the measurement force eliminated. Because the measurement force detecting device 100 can be attached to and detached from the caliper 500, there is no need for the caliper 500 to increase in size or cost and the user may attach the measurement force detecting device 100 to the caliper 500 as needed.

The present invention is not limited to the embodiment described above and may be modified as needed without departing from the scope of the present invention. In the embodiment described above, a case is described as exemplary in which the measurement force detecting device is attached to the slider of the caliper via the connection unit, but the connection unit is not mandatory. For example, the fixed unit (casing) may be directly attached and fixated to the slider of the caliper.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A caliper measurement force detecting device that is detachably attached to a slider of a caliper and detects measurement force of the caliper, the caliper measurement force detecting device comprising:
    a fixed housing that is fixedly attached to the slider so as not to displace relative to the slider;
    a movable support that is configured to allow displacement relative to the fixed housing along a direction parallel to a displacement direction of the slider; and
    pressure detectors that are arranged between the fixed housing and the movable support and are configured to detect pressure applied in the direction parallel to the displacement direction of the slider,
    wherein the movable support includes a finger hook that is provided proximate a finger hook of the slider and serves as an operator that pushes and pulls the slider in place of the finger hook of the slider.

2. The caliper measurement force detecting device according to claim 1, further comprising first and second elastic bodies provided between the movable support and the fixed housing, the first and second elastic bodies configured to apply equal force to the movable support from both directions, in the direction parallel to the displacement direction of the slider, such that a relative position of the movable support with respect to the fixed housing is a predetermined neutral position.

3. The caliper measurement force detecting device according to claim 1, wherein:
    one of guide grooves or projections are provided to one of the fixed housing and the movable support and extend in the direction parallel to the displacement direction of the slider, and
    the other of guide grooves or projections are provided to the other of the fixed housing and the movable support and are fitted with the one of the guide grooves or the projections, and slide in the direction parallel to the displacement direction of the slider.

4. The caliper measurement force detecting device according to claim 1, wherein
    the fixed housing includes a casing fixed to a back side of the slider,
    the casing comprises:
        an aperture on a bottom end surface so as to receive a portion of the movable support, and forms a storage space inside of the casing,
        one end side walls and other end side walls that face each other with a predetermined interval in the displacement direction of the slider on a plane perpendicular to the displacement direction of the slider, and
    the pressure detectors include a first pressure detecting element configured to be pressed against the one end side walls inside the casing and a second pressure detecting element configured to be pressed against the other end side walls inside the casing, the caliper measurement force detecting device further comprising:
        a first elastic body arranged between the first pressure detecting element and the movable support; and
        a second elastic body arranged between the second pressure detecting element and the movable support.

5. The caliper measurement force detecting device according to claim 4, further comprising a shaft fixed in the direction parallel to the displacement direction of the slider and configured to bridge the one end side walls and other end side walls inside the casing, wherein
    the movable support has a through-hole through which the shaft is passed and allows displacement in the direction parallel to the displacement direction of the slider along the shaft.

6. The caliper measurement force detecting device according to claim 4, wherein when the pressure detecting elements detect a predetermined measurement force, a user notification is generated by at least one of sound or light from the caliper measurement force detecting device or the caliper.

7. The caliper measurement force detecting device according to claim 4 wherein the caliper measurement force detecting device latches a measured value to the caliper, when the pressure detecting elements detect the predetermined measurement force.

* * * * *